(12) United States Patent
Kwon et al.

(10) Patent No.: US 10,103,397 B2
(45) Date of Patent: Oct. 16, 2018

(54) METAL-AIR BATTERY, VEHICLE SYSTEM COMPRISING THE METAL-AIR BATTERY, AND METHOD OF OPERATING THE METAL-AIR BATTERY

(71) Applicant: Samsung Electronics Co., Ltd., Suwon-si, Gyeonggi-do (KR)

(72) Inventors: Hyukjae Kwon, Suwon-si (KR); Jeongsik Ko, Seongnam-si (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 168 days.

(21) Appl. No.: 15/194,755

(22) Filed: Jun. 28, 2016

(65) Prior Publication Data
US 2017/0033379 A1    Feb. 2, 2017

(30) Foreign Application Priority Data

Jul. 28, 2015    (KR) .......................... 10-2015-0106769

(51) Int. Cl.
| | | |
|---|---|---|
| H01M 12/06 | (2006.01) | |
| H01M 8/04 | (2016.01) | |
| H01M 8/04828 | (2016.01) | |
| H01M 8/04119 | (2016.01) | |
| H01M 8/0444 | (2016.01) | |

(52) U.S. Cl.
CPC ..... *H01M 8/04828* (2013.01); *H01M 8/0444* (2013.01); *H01M 8/04164* (2013.01); *H01M 8/04171* (2013.01); *H01M 12/06* (2013.01); *H01M 2220/20* (2013.01)

(58) Field of Classification Search
CPC ......... H01M 8/04828; H01M 8/04164; H01M 8/04171; H01M 8/0444; H01M 12/06; H01M 2220/20
USPC ........................................................ 429/403
See application file for complete search history.

(56) References Cited

U.S. PATENT DOCUMENTS

| | | | | |
|---|---|---|---|---|
| 5,560,999 A | * | 10/1996 | Pedicini ................. | H01M 6/50 429/407 |
| 6,499,309 B1 | * | 12/2002 | Yeh ...................... | B01D 5/0039 62/235.1 |
| 8,790,802 B2 | | 7/2014 | Nakanishi | |
| 2001/0040061 A1 | * | 11/2001 | Matuda ............... | B60H 1/00278 180/68.2 |

(Continued)

FOREIGN PATENT DOCUMENTS

| | | | |
|---|---|---|---|
| JP | 2009046113 A | * | 3/2009 |
| KR | 1020140111066 A | | 9/2014 |

(Continued)

OTHER PUBLICATIONS

Gallagher et al., "Quantifying the promise of lithium-air batteries for electric vehicles*", Energy & Environmental Science, vol. 7, 2014, 1555.

*Primary Examiner* — Gregg Cantelmo
(74) *Attorney, Agent, or Firm* — Cantor Colburn LLP (57) ABSTRACT

A metal-air battery includes a battery module configured to provide electricity by oxidation of a metal and reduction of oxygen in air; and a first air purifier in fluid communication with the battery module and including a condenser configured to condense moisture in the air and remove the condensed moisture.

16 Claims, 10 Drawing Sheets

(56) References Cited

U.S. PATENT DOCUMENTS

2007/0199448 A1* 8/2007 Yates .................... B01D 53/02
                                                                    95/139
2009/0293513 A1* 12/2009 Sullivan ............... B01D 5/0015
                                                                    62/93
2016/0322686 A1    11/2016 Ko et al.

FOREIGN PATENT DOCUMENTS

KR       10-1470170 B1    12/2014
WO       2013/053653 A2    4/2013

* cited by examiner

METAL-AIR BATTERY, VEHICLE SYSTEM COMPRISING THE METAL-AIR BATTERY, AND METHOD OF OPERATING THE METAL-AIR BATTERY

CROSS-REFERENCE TO RELATED APPLICATION

This application claims priority to and the benefit of Korean Patent Application No. 10-2015-0106769, filed on Jul. 28, 2015, in the Korean Intellectual Property Office, and all the benefits accruing therefrom under 35 U.S.C. § 119, the content of which is incorporated herein by reference in its entirety.

BACKGROUND

1. Field

The present disclosure relates to metal-air batteries, vehicle systems including the metal-air batteries, and methods of driving the vehicle systems.

2. Description of the Related Art

A metal-air battery includes a plurality of metal-air cells, and each of the metal-air cells includes a negative electrode that may occlude and release ions and a positive electrode that uses oxygen in air as an active material. Reduction and oxidation of oxygen that is introduced from the outside occurs at the positive electrode, and oxidation and reduction of a metal occur at the negative electrode. Chemical energy that is generated during these reactions is converted into electrical energy and the electrical energy is extracted. For example, a metal-air battery absorbs oxygen during discharging and emits oxygen during charging. Since a metal-air battery uses oxygen that is present in air, an energy density of the metal-air battery may be greatly increased. For example, a metal-air battery may have an energy density that is several times higher than an energy density of an existing lithium-ion battery.

Also, since a metal-air battery has a low risk of ignition at an abnormally high temperature, the metal-air battery has high stability. Since a metal-air battery operates only by absorbing and emitting oxygen without using a heavy metal, the metal-air battery has a low risk of environmental pollution. Metal-air batteries have recently been actively studied because of such various advantages.

Due to the advantages of meta-air batteries, additional methods of further increasing the capacity and life of the metal-air battery are needed.

SUMMARY

During operation of a metal-air battery, air is supplied to a positive electrode and oxygen molecules are used as an active material. In this case, moisture ($H_2O$) included in the air may inhibit generation of metal peroxide (e.g., $Li_2O_2$), thereby reducing the capacity and life of the metal-air battery Provided herein is a metal-air battery including a plurality of air purifiers that may provide purified air to a battery module, vehicle systems including the metal-air battery, and methods of driving the vehicle systems.

According to an aspect of an exemplary embodiment, a metal-air battery includes: a battery module configured to provide electricity by oxidation of a metal and reduction of oxygen in air; and a first air purifier in fluid communication with the battery module and including a condenser configured to condense moisture in the air and remove condensed moisture.

The first air purifier may further include a compressor configured to increase a pressure of the air.

The metal-air battery may further include: a density detector configured to detect a moisture content in a first purified air introduced into the battery module; and a controller configured to control an operation of the first air purifier based on information detected by the density detector.

The first air purifier is configured to remove moisture from the air when the moisture content in the first purified air discharged from the first air purifier is equal to or greater than a predetermined reference moisture content.

The metal-air battery may further include a second air purifier disposed between the first air purifier and the battery module and configured to remove an impurity from first purified air discharged from the first air purifier.

The second air purifier may be configured for pressure swing adsorption (PSA), thermal swing adsorption (TSA), pressure thermal swing adsorption (PTSA), vacuum swing adsorption (VSA), selective separation, or a combination thereof.

The second air purifier may include at least one of an adsorbent material and a selective transmitting film.

The adsorbent material may include at least one of a zeolite, alumina, silica gel, a metal-organic framework (MOF), a zeolitic imidazolate framework (ZIF), and activated carbon.

According to an aspect of another exemplary embodiment, a vehicle system includes: a metal-air battery; and an air conditioning apparatus including an evaporator, wherein the metal-air battery includes a battery module configured to provide electricity by oxidation of a metal and reduction of oxygen in air, and a first air purifier in fluid communication with the battery module and including a condenser configured to condense moisture in the air and remove the condense moisture.

The evaporator may include a first path through which a refrigerant flows, and the condenser may include a second path through which the air flows, wherein the second path is disposed to overlap a portion of the first path and is configured to cool the air with the refrigerant.

The second path may extend in a direction parallel to a direction of the first path and may be disposed to surround the portion of the first path.

The second path may extend in a direction which intersects a direction of the first path and may be disposed to surround a portion of the first path.

The vehicle system may further include: a density detector configured to detect a moisture content in purified air introduced into the battery module; and a controller configured to control an operation of the first air purifier based on information provided by the density detector.

The vehicle system may further include a second air purifier disposed between the first air purifier and the battery module and configured to remove an impurity from first purified air which flows through the first air purifier.

The second air purifier may be configured for pressure swing adsorption (PSA), thermal swing adsorption (TSA), pressure thermal swing adsorption (PTSA), vacuum swing adsorption (VSA), selective separation, or a combination thereof.

The second air purifier may include at least one of an adsorbent material and a selective transmitting film.

The adsorbent material may include at least one selected from zeolite, alumina, silica gel, metal-organic framework (MOF), zeolitic imidazolate framework (ZIF), and activated carbon.

A method of operating a metal-air battery includes: supplying air to a first air purifier; discharging purified air from the first air purifier; detecting a moisture content in the discharged purified air using a density detector; removing moisture from the air supplied to the first air purifier when the moisture content in the discharged purified air from the first air purifier is equal to or greater than a predetermined reference moisture content, wherein the first air purifier comprises a condenser to condense moisture in the air and remove the condensed moisture and a compressor to increase a pressure of the air; and introducing the discharged purified air into a battery module to operate the metal-air battery.

Additional aspects will be set forth in part in the description which follows and, in part, will be apparent from the description, or may be learned by practice of the presented exemplary embodiments.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

The inventive concept will now be described more fully with reference to the accompanying drawings, in which exemplary embodiments of the inventive concept are shown. In the drawings, the same reference numerals denote the same elements and thicknesses of elements may be exaggerated for clarity. The inventive concept may have different forms and should not be construed as limited to the exemplary embodiments set forth herein.

It will be understood that when an element is referred to as being "over" or "on" another element, it may be directly on or directly over the other element or intervening elements may be present therebetween. In contrast, when an element is referred to as being "directly on" or "directly over" another element, there are no intervening elements present.

While such terms as "first", "second", etc., may be used to describe various elements, components, regions, layers, and/or sections, these elements, components, regions, layers, and/or sections should not be limited to the above terms. The above terms are used only to distinguish one element, component, region, layer or section from another from another element, component, region, layer, or section. Thus, "a first element," "component," "region," "layer," or "section" discussed below could be termed a second element, component, region, layer, or section without departing from the teachings herein.

The singular forms "a," "an," and "the" are intended to include the plural forms, including "at least one," unless the context clearly indicates otherwise. Also, when a portion "includes" an element, another element may be further included, rather than excluding the existence of the other element, unless otherwise described. "At least one" is not to be construed as limiting "a" or "an."

As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
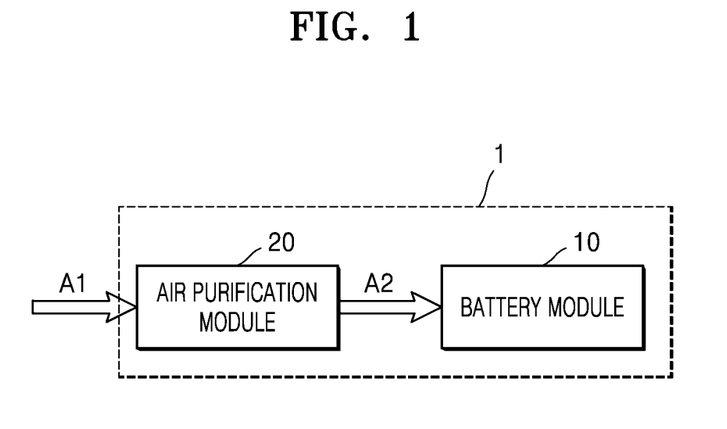
FIG. 1 is a block diagram of a metal-air battery according to an exemplary embodiment.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. FIG. 1 is a block diagram of a metal-air battery 1 according to an exemplary embodiment.

Referring to FIG. 1, the metal-air battery 1 according to an exemplary embodiment includes a battery module 10 and an air purification module 20. The metal-air battery 1 may be a lithium-air battery. However, the type of metal-air battery 1 is not limited thereto, and may include a sodium-air battery, a zinc-air battery, a potassium-air battery, a calcium-air battery, a magnesium-air battery, an iron-air battery, an aluminum-air battery, or an alloy-air battery including two or more of these metals.

The battery module 10 produces electricity by oxidation of a metal at an oxidation electrode, that is, a negative electrode, and reduction of oxygen at a reduction electrode, that is, a positive electrode.

For example, when the metal is lithium (Li), the metal-air battery 1 produces electricity when the lithium and oxygen react with each other to produce lithium peroxide ($Li_2O_2$) during discharging as shown in Reaction Formula 1.

$$Li + \tfrac{1}{2}O_2 \rightarrow \tfrac{1}{2}Li_2O_2 \qquad \text{Reaction Formula 1}$$

However, when impurities, such as for example, moisture ($H_2O$), are present in the air, an energy density and the life of the metal-air battery 1 are reduced due to a reaction which produces lithium hydroxide (LiOH), as shown in Reaction Formula 2. Also, when a large amount of moisture is present in the air, the lithium at the negative electrode may react with the moisture and to produce lithium hydroxide. In this case, the lithium may no longer be used as an electrode.

$$4Li + 6H_2O + O_2 \rightarrow 4(LiOH \cdot H_2O) \qquad \text{Reaction Formula 2}$$

The air purification module 20 is in fluid communication with the battery module 10.

Also, the air purification module 20 removes impurities in the air A1 to purify the air A1 and supplies first and second purified air A13 and A2, respectively, to the battery module 10.

The air purification module 20 according to an exemplary embodiment may remove an impurity in the external air A1 that is introduced into the air purification module 20.

The impurity may include a material other than oxygen ($O_2$) which is present in the air A1. For example, the impurity may include at least one of moisture ($H_2O$), carbon dioxide ($CO_2$), and nitrogen ($N_2$).

Figure 2:
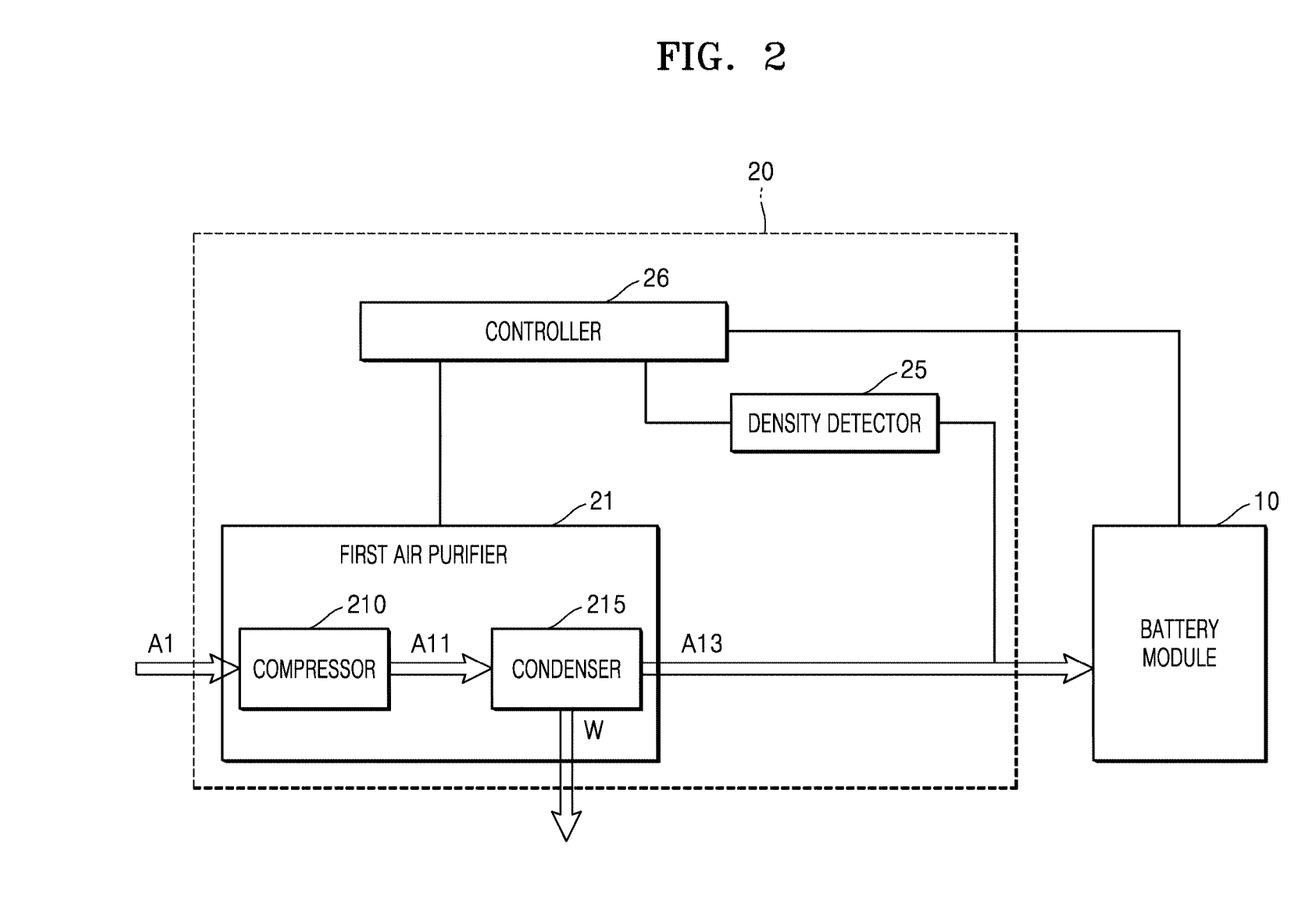
FIG. 2 is a block diagram of the metal-air battery including an air purification module, according to an exemplary embodiment.

FIG. 2 is a block diagram of the metal-air battery 1 including the air purification module 20 according to an exemplary embodiment.

Referring to FIG. 2, the air purification module 20 according to an exemplary embodiment may include a first air purifier 21, a density detector 25, and a controller 26. The first air purifier 21 is a purification unit for removing a first impurity. The first impurity may be at least one of moisture, carbon dioxide, and nitrogen. For example, the first air purifier 21 may remove moisture. The first air purifier 21 for removing moisture may be referred to as an "air dryer." According to an exemplary embodiment, the first air purifier 21 may include a compressor 210 and a condenser 215 in order to remove moisture from the air A1.

The compressor 210 may compress the air A1 having a low temperature and a low pressure into compressed air A11. For example, the first air purifier 210 may include at least one of compressors 210, and for example, may the first air purifier 210 may include a plurality of compressors 210. When the first air purifier 210 includes a plurality of compressors 210, the plurality of compressors 210 may be arranged in parallel in a direction in which the external air A1 flows, or may be arranged in series.

The condenser 215 may cool the compressed air A11 that passes through the compressor 210 and may generate first condensed air A12 (see FIG. 3) including condensed water W. In this case, a discharge path (not shown) may be disposed in the condenser 215 which allows the condensed water W included in the first condensed air A12 to be discharged to the outside and the first purified air A13 excluding the condensed water W to be discharged to the battery module 10.

The density detector 25 may detect the amount of the impurity, for example, moisture, included in the first purified air A13 that is introduced into the battery module 10. For example, the density detector 25 may use an electroconductive method or a capacitance method to detect a moisture content in the first purified air A13. The density detector 25 may be separate from the first air purifier 21 or may be integrally formed with the first air purifier 21. The density detector operably connects the first air purifier 210 and the controller 26.

The controller 26 may control an operation of the first air purifier 21 based on information provided by the density detector 25 about the amount of the impurity, for example, the moisture content, detected by the density detector 25. For example, the controller 26 may control operation of the compressor 210 and the condenser 215 provided in the first air purifier 21 based on the moisture content in the first purified air A13. A process of controlling the first air purifier 21 using the information provided by the density detector 25 and the controller 26 is further explained with reference to FIGS. 3 and 4.

Figure 3:
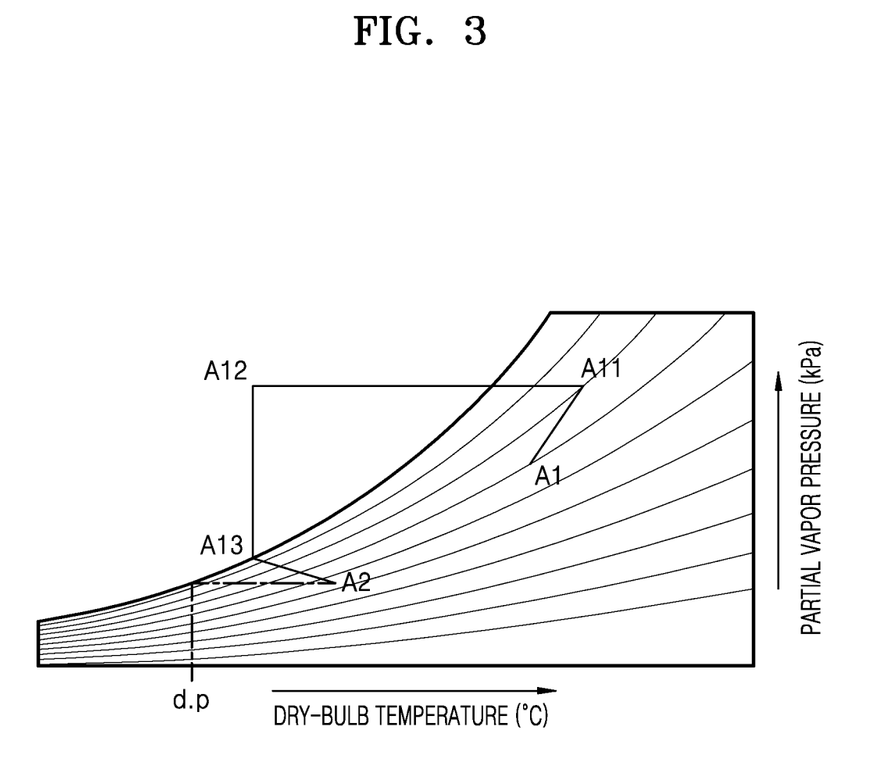
FIG. 3 is a humidity chart illustrating a relationship between partial vapor pressure (kilopascals, kPa) in the air and a dry-bulb temperature (° C.), according to an exemplary embodiment.
Figure 4:
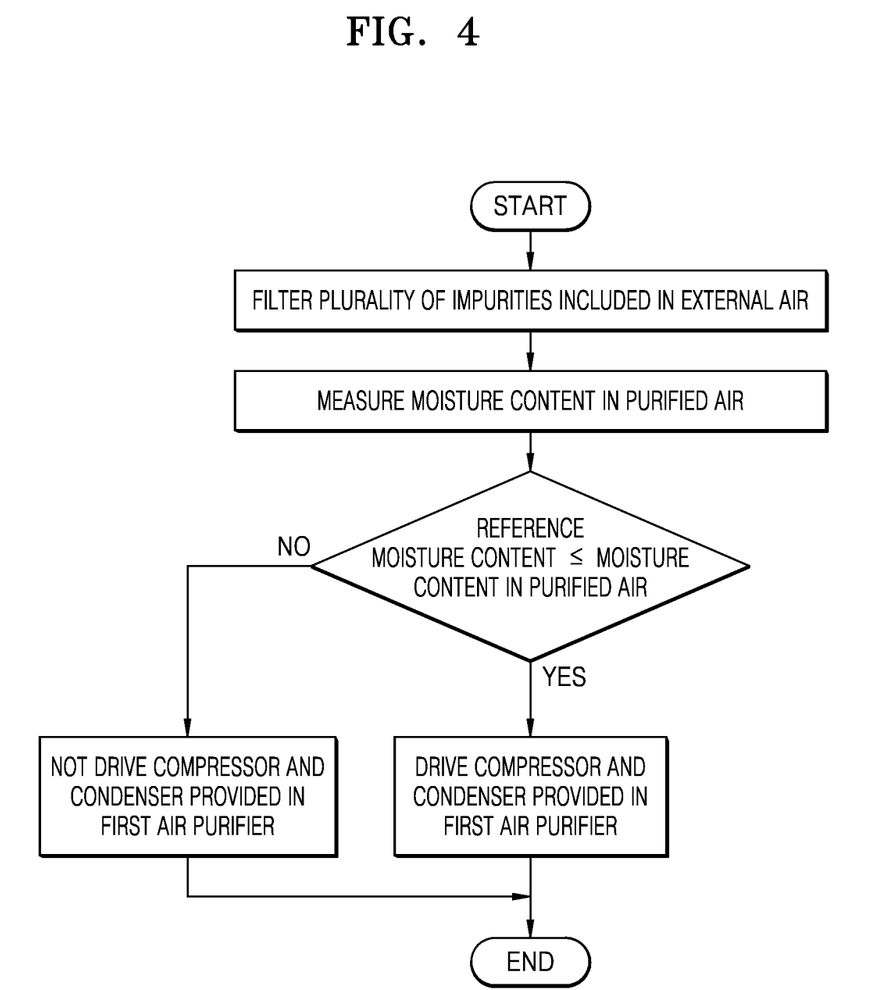
FIG. 4 is a flowchart of a method of operating a metal-air battery, according to an exemplary embodiment.

FIG. 3 is a humidity chart illustrating a relationship between a dry-bulb temperature and a state of vapor included in air according to an exemplary embodiment. FIG. 4 is a flowchart of a method of operating the metal-air battery 1 according to an exemplary embodiment.

A method of operating the metal-air battery 1 including the first air purifier 21 and a second air purifier 22 will now be explained with reference to FIGS. 4 and 5.

The metal-air battery 1 detects the amount of at least one impurity included in the first purified air A13 that is introduced into the battery module 10 using the density detector 25. For example, the density detector 25 may detect a moisture content in the first purified air A13 that is introduced into the battery module 10. The moisture content in the first purified air A13 that is introduced into the battery module 10 may vary depending upon the ambient conditions such as a temperature or a relative humidity is changed.

Based on the moisture content detected by the density detector 25, a need to change the moisture content in the first purified air A13 may be calculated or measured.

The controller 26 may control an operation of the first air purifier 21 based on the detected moisture content in the first purified air A13. By controlling the moisture content of the first purified air A13, the energy efficiency of the metal-air battery may be improved. For example, the controller 26 may control the operation of the compressor 210 and the condenser 215 provided in the first air purifier 21 based on the detected moisture content in the first purified air A13. For example, when the detected moisture content in the first purified air A13 is equal to or greater than a reference moisture content, the controller 26 may drive the compressor 210 and the condenser 215 provided in the first air purifier 21 to operate in order to remove moisture.

As the operation of the compressor 210 is driven by the controller 26, the air A1 having the low temperature and the low pressure that is introduced into the battery module 10 may be adiabatically compressed into the compressed air A11 having a high temperature and a high pressure.

The compressed air A11 that is discharged from the compressor 210 may be introduced into the condenser 215 and may be cooled into the first condensed air A12 including saturated vapor. A portion of the saturated vapor of the first condensed air A12 may be condensed into the condensed water W and the remaining portion of the vapor of the first condensed air A12 may be included as saturated vapor in the first purified air A13. In this case, the condensed water W condensed from the first condensed air A12 may be discharged to the outside of the air purification module 10 through a separate passage, and the first purified air A13 that is discharged from the condenser 215 may be introduced into the air purification module 10.

As described above, when the external air A1 that is introduced into the air purification module 20 passes through the first air purifier 21, impurities, for example, moisture, included in the external air A1 may be removed. If the metal-air battery 1 does not include the first air purifier 21, in contrast to the present exemplary embodiment, the air A1 from which the moisture is not removed may be directly supplied to the battery module 10, thereby leading to a side reaction. As a result of the side reaction, an energy density and the life of the metal-air battery 1 may be reduced. However, according to the present exemplary embodiment, since an impurity included in the external air A1 is removed by the first air purifier 21, a reduction in the life of the metal-air battery 1 may be prevented and the energy efficiency of the metal-air battery 1 may be improved.

Figure 5:
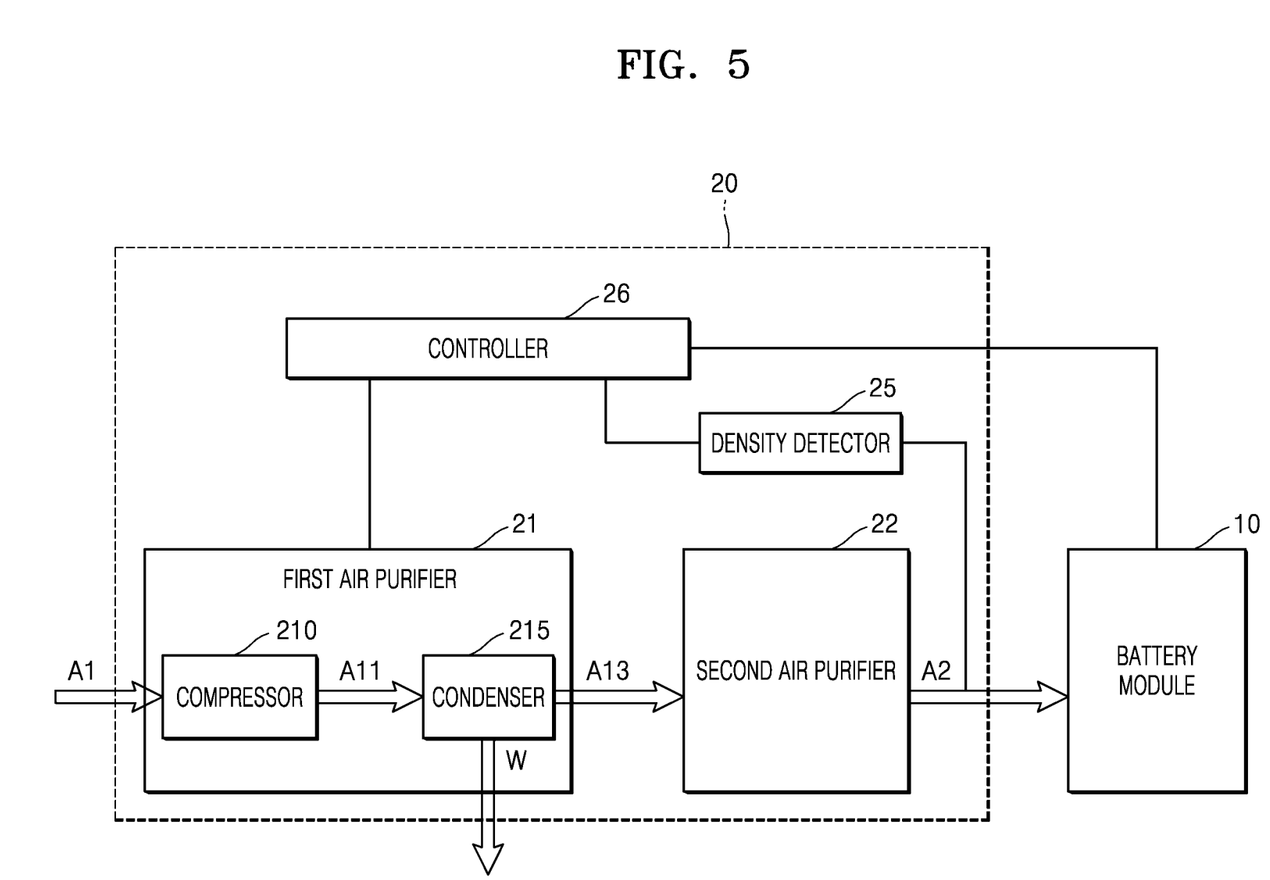
FIG. 5 is a block diagram of the metal-air battery including the air purification module, according to another exemplary embodiment.

FIG. 5 is a block diagram of the metal-air battery 1 including the air purification module 20 according to another exemplary embodiment. For convenience of explanation, the same elements as those described above will not be repeatedly explained.

Referring to FIG. 5, the air purification module 20 may include the first air purifier 21, the second air purifier 22, the density detector 25, and the controller 26. A second air purifier 22 may be disposed between the first air purifier 21 and the battery module 10 and may in fluid-communication with each of the first air purifier 21 and the battery module 10. The second air purifier 22 is a unit for removing a second impurity. In this case, the second impurity may be at least one of moisture, carbon dioxide, and nitrogen, and may be different from the first impurity. For example, when the first air purifier 21 removes moisture, the second air purifier 22 may remove nitrogen. However, when the second air purifier 22 removes the second impurity, it does not mean that the second air purifier 22 removes only the second impurity, and, for example, the second air purifier 22 may remove both the first impurity and the second impurity.

For example, the second air purifier 22 may remove nitrogen and may concentrate oxygen. The second air purifier 22 may concentrate oxygen so that the amount of oxygen in air supplied to the battery module 10 is equal to or greater than 21%, for example, equal to or greater than 30%, for example, equal to or greater than 40%. The second air purifier 22 for concentrating oxygen may be alternatively referred to as an "oxygen generator."

The second air purifier 22 may be configured to operate by pressure swing adsorption (PSA), thermal swing adsorption (TSA), pressure thermal swing adsorption (PTSA), vacuum swing adsorption (VSA), selective separation, or a combination thereof. The term "PSA" as used herein refers to a technology in which a specific gas is preferentially adsorbed to, or trapped by, an adsorbent material at a high partial pressure and is desorbed or discharged at a partial pressure that is reduced from the high partial pressure. The term "TSA" as used herein refers to a technology in which a specific gas is preferentially adsorbed to, or trapped by, an adsorbent material at a room temperature and is desorbed or discharged at a temperature that is increased from the room temperature. The term "PTSA" as used herein refers to a technology obtained by combining both the PSA and the TSA methods. The term "VSA" as used herein, refers to a technology in which a specific gas is preferentially adsorbed to, or trapped by, an adsorbent material at an atmospheric pressure and is desorbed or discharged in a vacuum state.

In the second air purifier 22, an adsorbent material (not shown) may be filled, a selective transmitting film (not shown) may be disposed, or the adsorbent material may be filled and the selective transmitting film may be disposed.

The adsorbent material selectively adsorbs impurities in the external air A1. The adsorbent material may be at least one of zeolite, alumina, silica gel, metal-organic framework (MOF), zeolitic imidazolate framework (ZIF), and activated carbon. The term "MOF" as used herein refers to a crystalline compound including metal ions or metal clusters coordinated to organic molecules to form one-, two-, or three-dimensional structures that may be porous. Also, the term "ZIF" as used herein refers to a nanoporous compound including tetrahedral $MN_4$ (M is a metal) clusters wherein M atoms are linked by an imidazolate ligand. However, the adsorbent material used for the second air purifier 22 is not limited thereto, and may be any material suitable for use as a porous material as long as it has micropores and is capable of adsorbing moisture.

The selective transmitting film in the second air purifier 22 selectively transmits components present in the air A1 other than the impurities. The selective transmitting film may include a plurality of ion exchange hollow fibers that are arranged in parallel, that is, in a direction parallel to a direction in which the air A1 flows.

For example, when the adsorbent material is filled, or the selective transmitting film is disposed, or when the adsorbent material is filled and the selective transmitting film is, a plurality of impurities and additional moisture may be removed from the first purified air A13 that flows from the first air purifier 21 into the second air purifier 22, and thus the first purified air A13 may be changed into second purified air A2 as shown in FIGS. 4 and 5. In this case, a dew point temperature (d.p.; see FIG. 3) of the second purified air A2 may be about −50° C., and for example, the amount of oxygen in the second purified air A2 may be equal to or greater than 21%, for example, equal to or greater than 30%, more preferably, equal to or greater than 40%.

As described above, since the first air purifier 21 and/or the second air purifier 22 is included in the metal-air battery 1, a plurality of impurities may be removed from the air A1, thereby maximizing the operation efficiency of the metal-air battery 1. However, since the compressor 210 and the condenser 215 included in the first air purifier 21 may increase an overall volume of the metal-air battery 1, when a compressor or a condenser included in a peripheral device is shared, an overall volume of a system may be reduced and the system may be more efficiently used.

Figure 6:
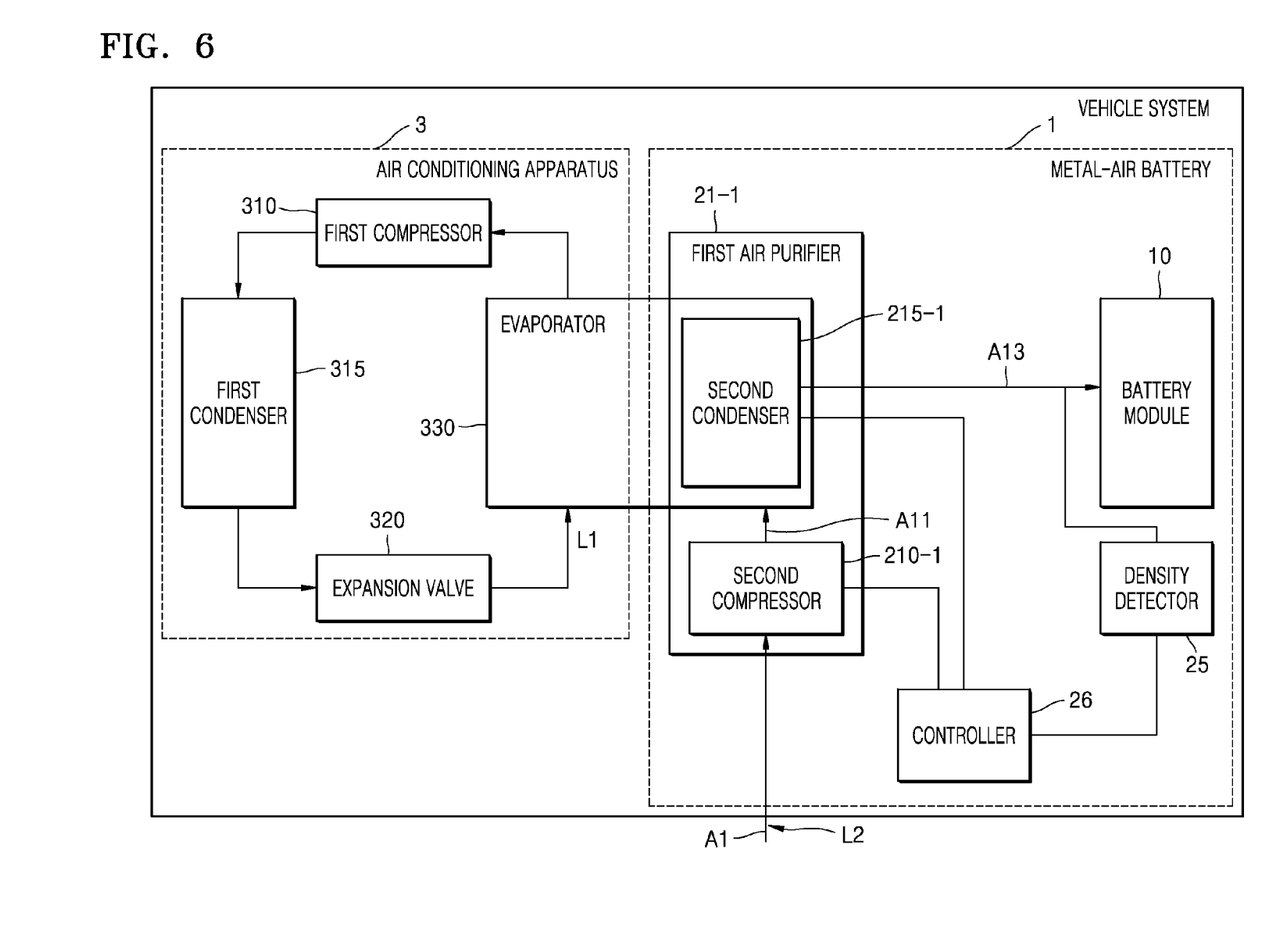
FIG. 6 is a block diagram of a vehicle system according to an exemplary embodiment.
Figure 7:
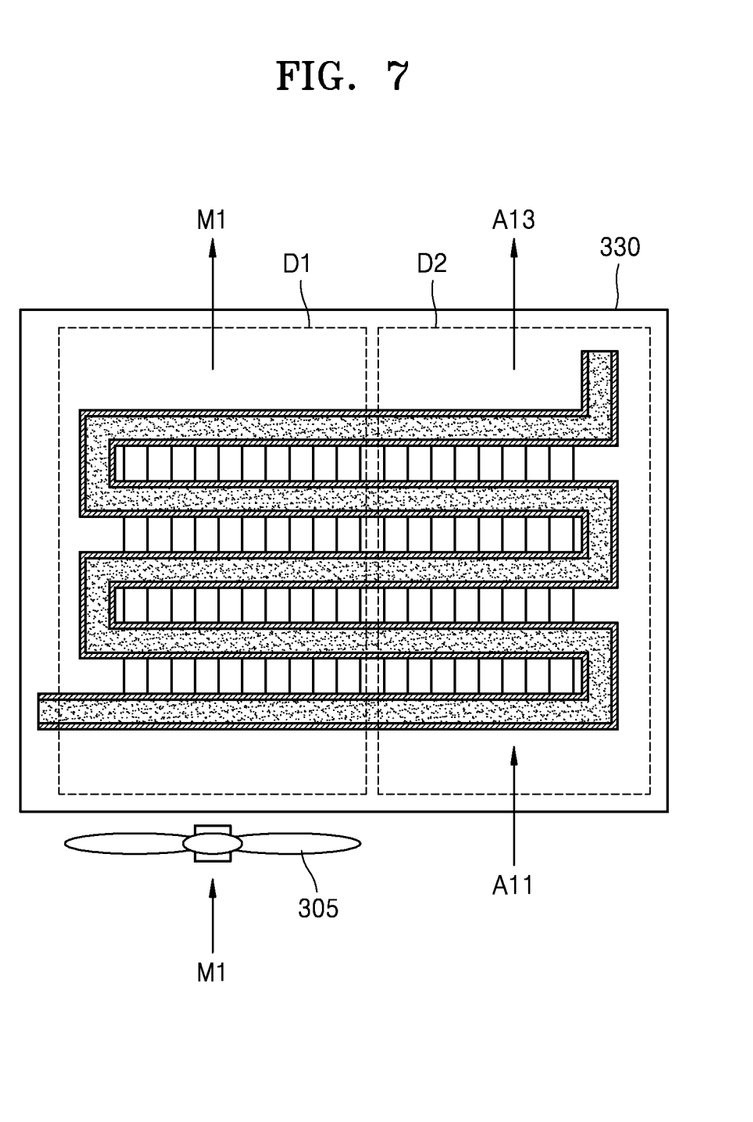
FIG. 7 is a view of the vehicle system including an air conditioning apparatus and the metal-air battery, according to an exemplary embodiment.

FIG. 6 is a block diagram of a vehicle system according to an exemplary embodiment. FIG. 7 is a view of an evaporator 330 according to an exemplary embodiment.

Referring to FIGS. 6 and 7, the vehicle system according to an exemplary embodiment may include the metal-air battery 1 and an air conditioning apparatus 3 that may adjust a temperature, a humidity, an air current, and a cleanness in a vehicle to optimal conditions according to the purpose of use. For example, the air conditioning apparatus 3 may be an air conditioner (AC). In this case, the air conditioning apparatus 3 may include a blower 305, a first compressor 310, a first condenser 315, an expansion valve 320, and the evaporator 330.

The blower 305 may be disposed in a housing (not shown), and may enable air in the vehicle to be introduced into the air conditioning apparatus 3, flow through the evaporator 330, and be discharged back into the vehicle. In this case, a refrigerant may circulate along a first path L1 by passing through the first compressor 310, the first condenser 315, the expansion valve 320, and the evaporator 330.

For example, the first compressor 310 may compress a refrigerant to a high temperature and a high pressure state and may supply the compressed refrigerant to the first condenser 315. The first compressor 310 may further receive a refrigerant having a low temperature and a low pressure that is discharged from the evaporator 330 and may compress the refrigerant into a refrigerant having a high temperature and a high pressure state.

The first condenser 315 may condense and liquefy the refrigerant having the high temperature and the high pressure that is discharged from the first compressor 310. For example, the first condenser 315 may include a refrigerant pipe that is connected to the first compressor 310. In this case, the first compressor 310 may include a refrigerant pipe that is bent several times to have a zigzag shape.

The expansion valve 320 may expand a refrigerant that is discharged from the first condenser 315 by a throttling process.

A refrigerant that is discharged from the expansion valve 320 may flow to the evaporator 330 and may be evaporated into a gaseous refrigerant having a low temperature and a low pressure while passing through the evaporator 330. Next, the gaseous refrigerant having the low temperature and the low pressure that is discharged from the evaporator 330 may be supplied back to the first compressor 310. In this case, for example, the evaporator 330 may include a refrigerant pipe that is connected to the expansion valve 320.

The evaporator 330 according to an exemplary embodiment may be divided into a first cooling area D1 and a second cooling area D2, as shown in FIG. 7. In this case, air M1 in the vehicle may be introduced into the first cooling area D1 by the blower 305, may contact the evaporator 330 to be cooled, and may be discharged back into the vehicle to reduce a temperature in the vehicle. Also, the compressed air A11 that is discharged from a second compressor 210-1 of the metal-air battery 1 may be introduced into the second cooling area D2 to be cooled.

The metal-air battery 1 that is provided in the vehicle system is an apparatus for providing power to the vehicle system. For convenience of explanation, the same elements as those included in the metal-air battery 1 described above will not be repeatedly explained.

The metal-air battery 1 may include the battery module 10 and a first air purifier 21-1. In this case, the first air purifier 21-1 may include a second compressor 210-1 and a second condenser 215-1.

The air A1 may be introduced into the first air purifier 21-1 through a second path L2. In this case, the second path L2 may be in fluid communication with the second compressor 210-1 and the second condenser 215-1. The air A1 that flows through the second path L2 may pass through the first air purifier 21-1, that is, the second compressor 210-1 and the second condenser 215-1, and then may be introduced into the battery module 10.

The controller 26 may determine whether to drive the second compressor 210-1 and the second condenser 215-1 based on information about the amount of a plurality of impurities, for example, a moisture content, detected from the first purified air A13 by the density detector 25. A process of determining whether to drive operation of the second compressor 210-1 and the second condenser 215-1 based on the moisture content in the first purified air A13 is substantially the same as that described above, and thus will not be repeatedly explained.

The first air purifier 21-1 may include the second compressor 210-1 and the second condenser 215-1. For example, in this case, the second condenser 215-1 may be disposed in the second cooling area D2 of the evaporator 330 that is provided in the air conditioning apparatus 3. Accordingly, the compressed air A11 that is introduced into the second condenser 215-1 may be cooled by the evaporator 330 and may be changed into the first condensed air A12 including saturated vapor. In this case, part of vapor of the first condensed air A12 may be condensed into the condensed water W and the remaining part of the vapor of the first condensed air A12 may be included as saturated vapor in the first purified air A13. The condensed water W condensed from the first condensed air A12 may be discharged to the outside through a separate path (not shown), and the first purified air A13 excluding the condensed water W may be discharged from the second condenser 215-1 and may be introduced into the battery module 10.

As described above, since a part of the evaporator 330 that is disposed in the air conditioning apparatus 3 is used as the second condenser 215-1 of the metal-air battery 1, a cost of providing the second condenser 215-1 in the metal-air battery 1 may be reduced and an overall volume of the vehicle system may also be reduced.

When a part of the evaporator 330 of the air conditioning apparatus 3 is used as the second compressor 210-1 of the metal-air battery 1, the compressed air A11 that passes through the second compressor 210-1 may be more efficiently cooled as a contact area between the evaporator 330 and the compressed air A11 increases. Accordingly, in order to efficiently cool the compressed air A11, the shape of the evaporator 330 and the shape of the second condenser 215-1 may be modified as needed.

Figure 8:
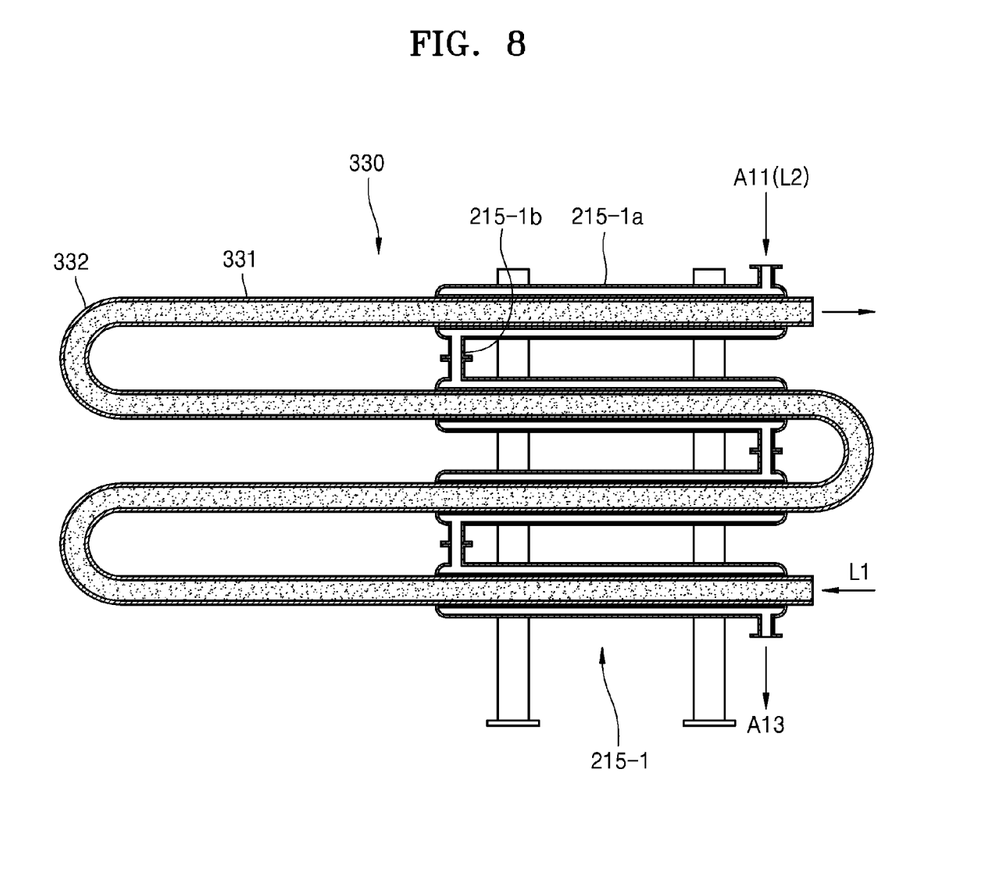
FIG. 8 is a partial cross-sectional view of an evaporator of the air conditioning apparatus and a second condenser of the metal-air battery, according to an exemplary embodiment.
Figure 9:
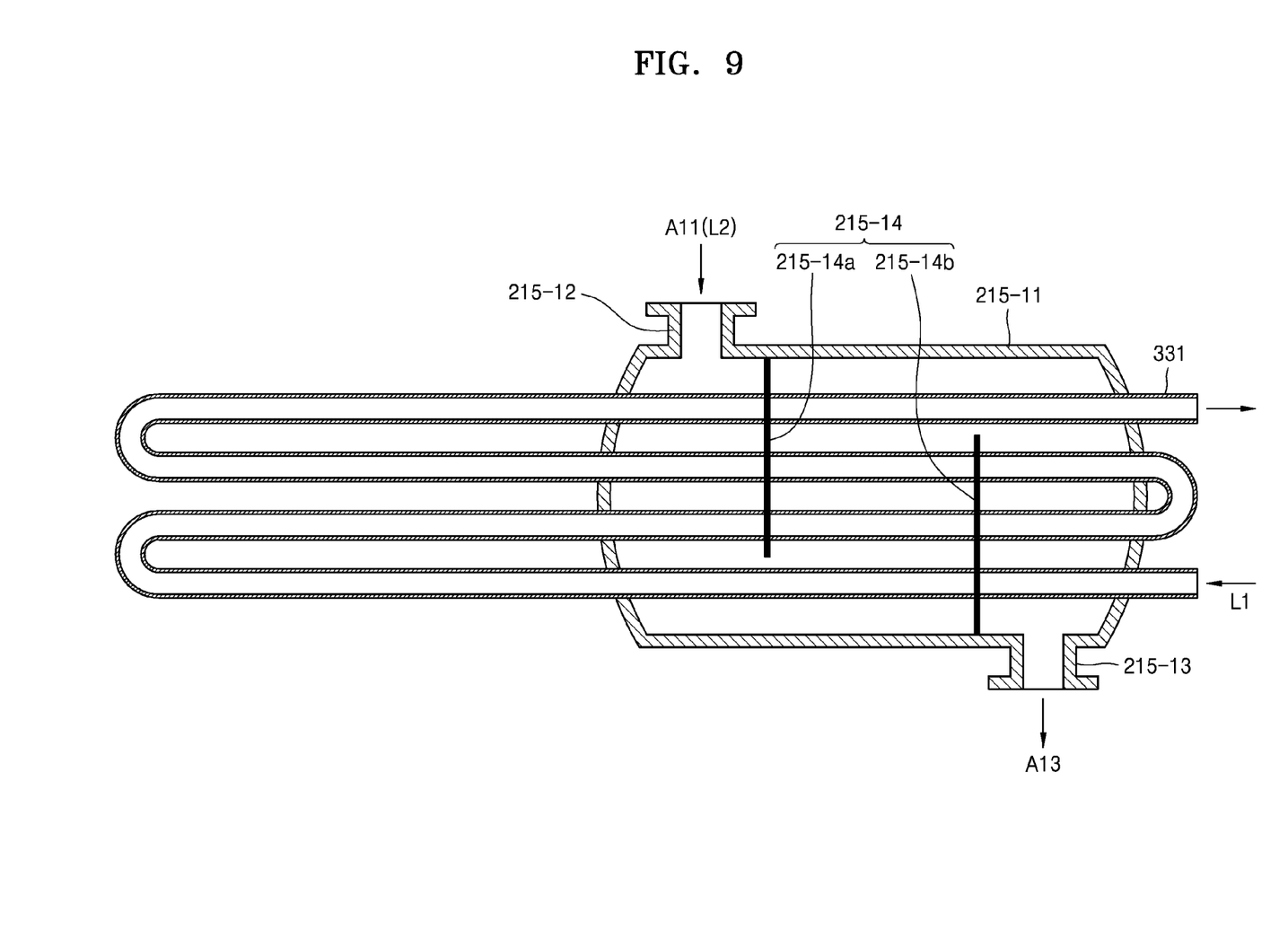
FIG. 9 is a partial cross-sectional view of the evaporator of the air conditioning apparatus and the second condenser of the metal-air battery, according to another exemplary embodiment.

FIG. 8 is a partial cross-sectional view of the evaporator 330 of the air conditioning apparatus 3 and the second condenser 215-1 of the metal-air battery 1 according to an exemplary embodiment. FIG. 9 is another partial cross-sectional view of the evaporator 330 of the air conditioning apparatus 3 and the second condenser 215-1 of the metal-air battery 1 according to another exemplary embodiment.

Referring to FIG. 8, for example, in the first path L1 of the evaporator 330 through which a refrigerant flows, a plurality of refrigerant pipes 331 extend in one direction and are spaced apart from one another by a predetermined interval and first connection pipes 332 are disposed to connect both end portions of the refrigerant pipes 331. In this case, a refrigerant that is discharged from the expansion valve 320 (not shown) may flow along the refrigerant pipes 331 and the first connection pipes 332, and may be evaporated into a gas having a low temperature and a low pressure while flowing along the refrigerant pipes 331 and the first connection pipes 332.

Also, in the second path of the second condenser 215-1 through which the compressed air A11 flows, a plurality of compressed air pipes 215-1a are spaced apart from one another at a predetermined interval and second connection pipe 215-1b is disposed to connect the compressed air pipes 215-1a. The plurality of compressed air pipes 215-11 extend in a same direction as the refrigerant pipes 331 and thus may be parallel to the refrigerant pipes 331.

For example, the second path L2 may extend in the same direction as the first path L1 and may surround a part of the first path L1. The compressed air pipes 215-1a that are disposed in the same direction as the second path L2 may surround a portion of the refrigerant pipes 331 of the evaporator 330 that are disposed in the first path L1. For example, the second path L2 may extend in a direction parallel to a direction of the first path L1 and may be disposed to surround the portion of the first path. Accordingly, the compressed air A11 that flows along the compressed air pipes 215-1a may be cooled by a refrigerant that flows along the refrigerant pipes 331 through the outer wall portions of the refrigerant pipes 331.

Referring to FIG. 9, alternatively, in the first path L1 of the evaporator 330 through which a refrigerant flows, the plurality of refrigerant pipes 331 extend in one direction and are spaced apart from one another at a predetermined interval. In this case, the second path L2 of the second condenser 215-1 through which the compressed air A11 flows may extend in a direction which intersects with a direction of the first path L1 and may surround a portion of the first path L1. For example, in the second path L2 of the second condenser 215-1 through which the compressed air A11 flows, a case portion 215-11 that surrounds a portion of the refrigerant pipes 331, a compressed air inlet 215-12 that is disposed at one side of the case portion 215-11, a compressed air outlet 215-13 that is spaced apart from the compressed air inlet 215-12 at a predetermined interval in the direction in which the refrigerant pipes 331 extend, and a plurality of partition walls 215-14 that are disposed between the compressed air inlet 215-12 and the compressed air outlet 215-13. In this case, the plurality of partition walls 215-14 may extend upward or downward from the case portion 215-11 in a direction which intersects the direction in which the refrigerant pipes 331 extend and may block the flow of the compressed air A11.

For example, a first partition wall 215-14a may extend from the top of the case portion 215-11 to a position that is spaced apart from the bottom of the case portion 215-11 at a predetermined interval. A second partition wall 215-14b may extend from the bottom of the case portion 215-11 to a position that is spaced from the top of the case portion 215-11 at a predetermined interval. In this case, the first partition wall 215-14a and the second partition wall 215-14b may be alternately disposed. Accordingly, the compressed air A11 may be introduced through the compressed air inlet 215-12 and may flow along the first partition wall 215-14a and the second partition wall 215-14b. The compressed air A11 that flows along the first partition wall 215-14a and the second partition wall 215-14b may be cooled by a refrigerant that flows through the refrigerant pipes 331 by contacting the outer wall portions of the refrigerant pipes 331.

Figure 10:
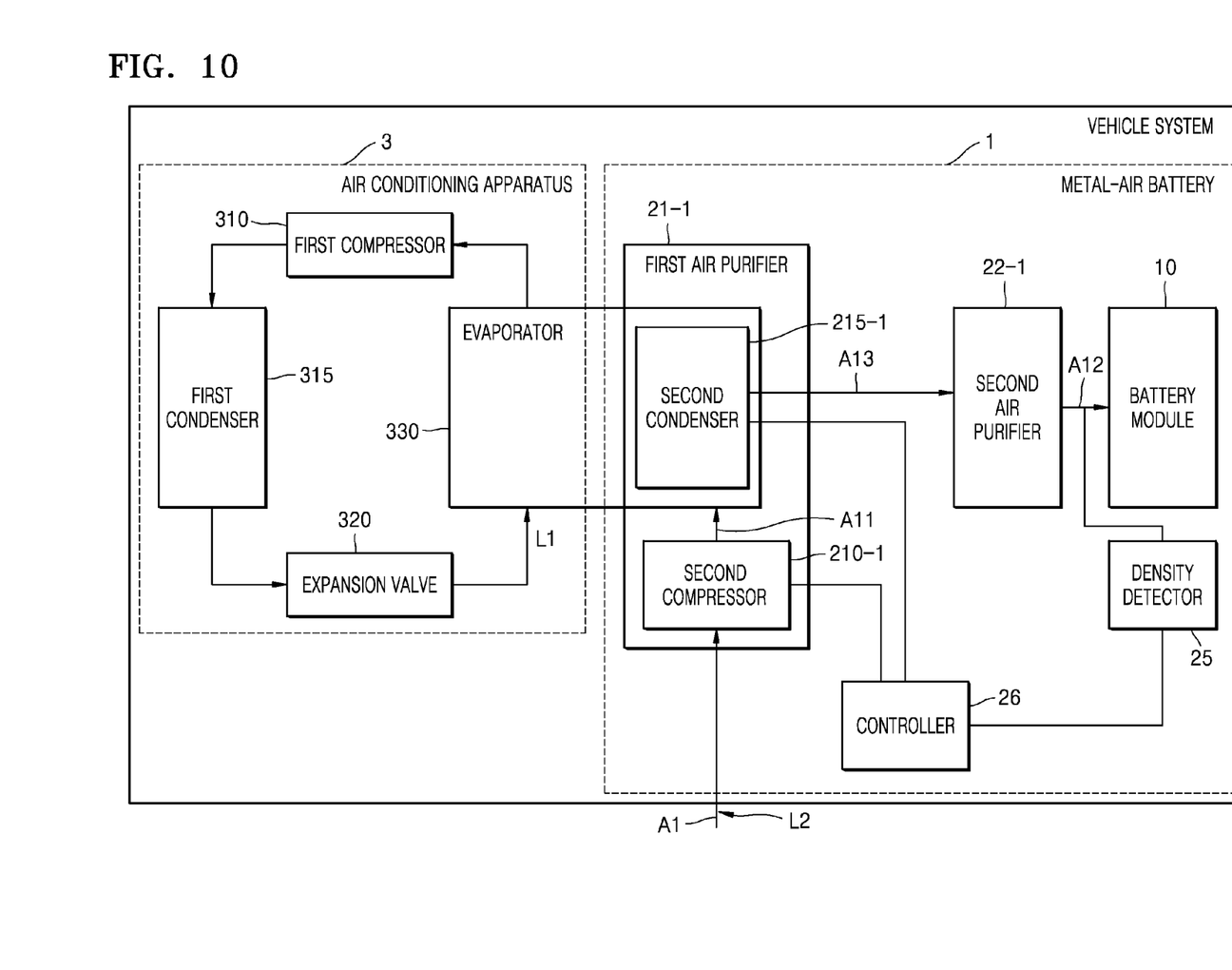
FIG. 10 is a block diagram of the vehicle system according to another exemplary embodiment.

FIG. 10 is a block diagram of the vehicle system according to another exemplary embodiment.

The metal-air battery 1 is an apparatus for providing power to the vehicle system and may adjust a temperature, a humidity, an air current, and a cleanness in the vehicle to optimal conditions according to the purpose of use. For convenience of explanation, the same elements as those included in the metal-air battery 1 and the air conditioning apparatus 3 will not be repeatedly explained.

Referring to FIG. 10, the metal-air battery 1 may include the battery module 10, the first air purifier 21-1, and a second air purifier 22-1.

The external air A1 may be introduced into the first air purifier 21-1 through the second path L2. In this case, the second path L2 may be in fluid communication with the second compressor 210-1 and the second condenser 215-1. The external air A1 that flows through the second path L2 may pass through the first air purifier 21-1, that is, the second compressor 210-1 and the second condenser 215-1, and then may be introduced into the second air purifier 22-1.

An impurity including moisture of the first purified air A13 that is discharged from the first air purifier 21-1 may be removed while the first purified air A13 passes through the second air purifier 22-1. However, a process of removing the impurity including the moisture are substantially the same as that described above for the first and second air purifiers 21 and 22, and thus will not be repeatedly explained.

As described above, when ambient conditions are changed, since an operation of the first air purifier 21 is controlled based on the amount of impurities present in the air that is introduced from the outside, the operation efficiency of the metal-air battery 1 may be maximized, thereby improving the energy efficiency of the metal-air battery 1. In addition, since the second condenser 215-1 that is included in the first air purifier 21 may be shared with the evaporator 330 that is provided in the air conditioning apparatus 3, an overall volume of the vehicle system may be reduced and the vehicle system may be more efficiently used.

Since a metal-air battery according to an exemplary embodiment removes moisture in air that is supplied to a battery module, a side reaction caused by the moisture may be avoided, thereby improving the energy efficiency and the life of the metal-air battery.

Also, since the metal-air battery according to an exemplary embodiment actively cooperates with an air conditioning apparatus included in a vehicle system to remove moisture content in air that is supplied to the battery module, an overall volume of the vehicle system may be reduced.

While one or more exemplary embodiments have been described with reference to the figures, it will be understood by those of ordinary skill in the art that various changes in form and details may be made therein without departing from the spirit and scope as defined by the following claims.

What is claimed is:

1. A metal-air battery comprising:
   a battery module configured to provide electricity by oxidation of a metal and reduction of oxygen in air;

a first air purifier in fluid communication with the battery module and comprising a condenser configured to condense moisture in the air and remove the condensed moisture;
a density detector configured to detect a moisture content in a first purified air introduced into the battery module; and
a controller configured to control an operation of the first air purifier based on information detected by the density detector,
wherein the first air purifier is configured to remove moisture from the air when the moisture content in the first purified air discharged from the first air purifier is equal to or greater than a predetermined reference moisture content.

2. The metal-air battery of claim 1, wherein the first air purifier further comprises a compressor configured to increase a pressure of the air.

3. The metal-air battery of claim 1, further comprising a second air purifier disposed between the first air purifier and the battery module and configured to remove an impurity from first purified air discharged from the first air purifier.

4. The metal-air battery of claim 3, wherein the second air purifier is configured for pressure swing adsorption, thermal swing adsorption, pressure thermal swing adsorption, vacuum swing adsorption, selective separation, or a combination of thereof.

5. The metal-air battery of claim 4, wherein the second air purifier comprises at least one of an adsorbent material and a selective transmitting film.

6. The metal-air battery of claim 5, wherein the adsorbent material comprises at least one of zeolite, alumina, silica gel, metal-organic framework (MOF), zeolitic imidazolate framework (ZIF), and activated carbon.

7. A vehicle system comprising:
a metal-air battery; and
an air conditioning apparatus comprising an evaporator,
wherein the metal-air battery comprises
a battery module configured to provide electricity by oxidation of a metal and reduction of oxygen in air,
a first air purifier in fluid communication with the battery module and comprising a condenser configured to condense moisture in the air and remove the condensed moisture,
wherein the evaporator comprises a first path through which a refrigerant flows, and the condenser comprises a second path through which the air flows, and
wherein the second path is disposed to overlap a portion of the first path and is configured to cool the air with the refrigerant.

8. The vehicle system of claim 7, wherein the second path extends in a direction parallel to a direction of the first path and is disposed to surround the portion of the first path.

9. The vehicle system of claim 7, wherein the second path extends in a direction which intersects a direction of the first path and is disposed to surround a portion of the first path.

10. The vehicle system of claim 7, further comprising:
a density detector configured to detect a moisture content in purified air introduced into the battery module; and
a controller configured to control an operation of the first air purifier based on information provided by the density detector.

11. The vehicle system of claim 7, further comprising a second air purifier disposed between the first air purifier and the battery module and configured to remove an impurity from first purified air which flows through the first air purifier.

12. The vehicle system of claim 11, wherein the second air purifier is configured for swing adsorption, thermal swing adsorption, pressure thermal swing adsorption, vacuum swing adsorption, and selective separation, or a combination thereof.

13. The vehicle system of claim 11, wherein the second air purifier comprises at least one of an adsorbent material and a selective transmitting film.

14. The vehicle system of claim 13, wherein the adsorbent material comprises at least one of zeolite, alumina, silica gel, metal-organic framework (MOF), zeolitic imidazolate framework (ZIF), and activated carbon.

15. A method of operating a metal-air battery comprising:
supplying air to a first air purifier;
discharging purified air from the first air purifier;
detecting a moisture content in the discharged purified air using a density detector;
removing moisture from the air supplied to the first air purifier when the moisture content in the discharged purified air from the first air purifier is equal to or greater than a predetermined reference moisture content, wherein the first air purifier comprises a condenser to condense moisture in the air and remove the condensed moisture and a compressor to increase a pressure of the air; and
introducing the discharged purified air into a battery module to operate the metal-air battery.

16. The method of claim 15, wherein the method further comprises removing an impurity from the discharged purified air from the first air purifier using a second air purifier disposed between the first air purifier and the battery module.

* * * * *